United States Patent [19]

Vinokur

[11] Patent Number: 4,649,962
[45] Date of Patent: Mar. 17, 1987

[54] HOLLOW TUBULAR SHEATHING FOR SAUSAGES, AND PROCESS OF MANUFACTURE

[75] Inventor: Isaac Vinokur, Buenos Aires, Argentina

[73] Assignee: Gunter Kollross, Fed. Rep. of Germany

[21] Appl. No.: 748,903

[22] Filed: Jun. 26, 1985

[30] Foreign Application Priority Data

Jun. 26, 1984 [AR] Argentina .............................. 297017

[51] Int. Cl.$^4$ ............................................. A22C 13/02
[52] U.S. Cl. .................................... 138/118.1; 17/45; 426/105; 428/36
[58] Field of Search ..................... 138/118.1; 426/105, 426/135, 138, 140; 17/45; 428/36

[56] References Cited

U.S. PATENT DOCUMENTS 3,669,692  6/1972  Turbak ............................ 138/118.1
3,695,901 10/1972  Winokur .......................... 138/118.1
4,550,042 10/1985  Ardrae et al. ............... 138/118.1 X Primary Examiner—Stephen Marcus
Assistant Examiner—Mark Thronson
Attorney, Agent, or Firm—Larson and Taylor

[57] ABSTRACT

A bellows-like hollow member formed of gathered tubular sheathing material, for processing, especially as a peel-skin for the production of small sausages, produced as follows: polypropylene with copolymers is extruded in a smooth foil of three inseparable layers, of which the middle layer is stronger and the two outside layers have a lower melting point. The foil is then stretched to increase its strength, and is formed into a tube with a lengthwise seam along its entire length, formed by overlapping and consolidation of its lengthwise edges. Finally, the tube is gathered bellows-like forming a plurality of folds and forming hollow member, and is simultaneously rotated around its axis so that the lengthwise seam produces a helical path. The tubular sheathing which is obtained by this gathering is of inexpensive material, can be easily peeled from the boiled meat emulsion, can be used without difficulty in sausage machines, and is not sensitive during storage to moisture and high temperatures.

3 Claims, 3 Drawing Figures

HOLLOW TUBULAR SHEATHING FOR SAUSAGES, AND PROCESS OF MANUFACTURE

FIELD OF THE INVENTION

The invention relates to a process for production of a tubular sheathing section gathered into a bellows-like hollow member for processing, especially as a peel-skin for the production of small sausages, as well as a hollow member produced according to the process.

BACKGROUND OF THE INVENTION

Small sausages without skins are produced today in great quantities in sausage machines using a plastic skin which, in sections of suitable lengths, e.g. of 30 m and longer, is gathered into bellows-like hollow members. The hollow members are then added to the top of the filling pipe of a sausage machine, from where the plastic skin is drawn out to be filled with meat emulsion and thus is smoothed out. The rope of sausage which is thus produced is divided into individual sausages, boiled and cooled. The plastic skin is then ready for packaging and sale.

Extruded tubular cellulose sheathing material is generally used as a plastic skin for small skinless sausages which are produced in this manner, which is very expensive. It is also a drawback that the collagen components of the meat emulsion adhere to the cellulose skin, and peeling the small sausage is made more difficult. Of course, this difficulty can be overcome to a certain extent by special handling of the cellulose material, which, however, further raises the already high cost. Also, on account of its sensitivity to humidity and temperature, tubular cellulose sheathing material can be stored only under special conditions and with use of costly packaging.

SUMMARY OF THE INVENTION

The object of the invention is to overcome these drawbacks and to facilitate the production of tubular sheathing sections gathered into bellows-like hollow members for processing, especially as peel-skin for the production of small sausages, of a material which is not costly and provides for simple peeling of the boiled meat emulsion without special treatment, and is not sensitive to humidity and increased temperatures during storage.

The solutions to the above problems are provided in the tubular sheathing of the present invention. The sheathing is comprised of a foil of three inseparable layers of synthetic plastic materials shaped into a tube and gathered axially into a bellows-like series of folds with a helical lengthwise seam.

The invention can be constructed by the following steps:

(a) extruding at least two dissimilar synthetic polymers into a smooth foil of three inseparable layers, of which the middle layer is thicker and stronger than the two outside layers, while both outside layers have a lower melting point, (b) stretching the foil in biaxial diretions to increase its strength, (c) shaping the foil with overlapping and consolidation of its lengthwise edges into a tube with a lengthwise seam along its entire length, and (d) gathering said tube along its entire length in bellows-like fashion to form a plurality of folds while simultaneously rotating said tube around its axis so as to produce a helical path of said lengthwise seam on said tube.

The preferred middle layer of the foil employed in the invention is polypropylene. Polypropylene is a very inexpensive material in comparison with cellulose and is characterized by its water-impermeability as well as its lack of sensitivity to humidity and heat. However, it is not strong. Therefore, in packaging, it is used mainly for protection against moisture penetration, without special strength requirements. It is used, for example, in the packaging of cigarettes.

It is also known to greatly increase the strength of polypropylene foils by stretching in lengthwise and transverse directions immediately at the extrusion. Such biaxial stretching however presupposes a flat spread out foil and does not allow practical application for extruded tubular material. Polypropylene foils also can be welded or tightly fitted together in some other manner only with difficulty. All of this explains why polypropylene has not been used heretofore as a sausage sheathing, despite its low cost and its characteristic of easy separability from the boiled meat emulsion in sausage production.

The invention overcomes these difficulties. Using the three-layer extrusion of the invention, a smooth foil with weldable outside edges is produced, which facilitates biaxial stretching, before it is formed into a tube with a lengthwise seam along its entire length by overlapping and consolidating its edges. Accumulation of the tube packing, caused by the seam at certain points on the periphery of the tube during subsequent gathering of the tube is prevented by simultaneously pivoting said tube, and the seam points are continuously distributed around the periphery of the hollow member. It can thus be tightly gathered without danger that the hollow member will buckle.

The copolymers used in this invention are preferably those that have strong adherent characteristics to polypropylene and other similar materials. Illustrative of copolymers usable in the invention are copolymers of alpha-olefins, such as ethylene/propylene copolymers.

The tube material obtained in this manner is nontoxic and retains its physico-chemical properties during the boiling process. It has an elasticity which allows the sausage sheathing to adapt to expansion of the meat emulsion during boiling and also to shrinkage during cooling. The surface of the small sausage thus remains smooth. Since the emulsion adheres at no time to the tubular sheathing, no difficulty arises with peeling it off the sausage.

Tests have shown that the bellows-like hollow members produced by the process according to the invention can be used without difficulty in high velocity filler machines. The tubular sheathing material placed in the top of the filler pipe can be pulled out during filling with the meat emulsion without great resistance and can thus be unfolded.

An improvement with reference to the thickness and permanence of the bellows-like hollow member in one advantageous configuration of the process of the invention can be produced by the following additional process steps:

(e) pressing together and heating of the gathered and pivoted tube at temperatures between 70° and 130° C. for the purpose of obtaining an easily dissoluble consolidation of the folds with each other, and (f) cooling the tube to fix the fold configuration.

The gathered tubular sheathing material loses its smoothness as a result of the pressing together and heating, and takes a new shape following cooling, which it retains because of the adherence of the consolidated folds. Thus, with the aid of the temporary adherence, the tubular sheathing section remains pressed together in a plurality of folds forming its shortest possible length, produced by the pressing together, until it is again stretched out when it is filled with the meat emulsion in the sausage machine. Furthermore, a rigid structure is formed by the consolidation of the folds, which allows rapid rotation while the skin which is being filled is also being moved forward, during the filling, while it is being carried through the filler head of the sausage machine.

The tubular sheathing of the invention, useful as a peelskin for the production of sausages, comprises a biaxially stretched foil of three inseparably connected layers, said layers comprised of a middle layer which is thicker and stronger than the outer layers and two outer layers which have a lower melting point than the middle layer, formed into a tube gathered axially into a bellows-like series of folds with a helical lengthwise seam, so that the folds adhere temporarily to each other and can be progressively pulled apart during filling.

The invention is to be explained in greater detail hereinafter relative to one exemplary embodiment which is shown in the drawings.

DETAILED DESCRIPTION OF THE DRAWINGS

Figure 1:
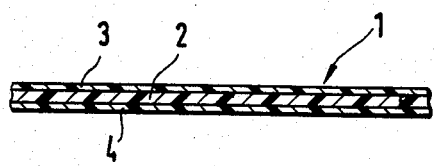
FIG. 1, a transverse section through a piece of three-layered foil material of polypropylene with outside layers of copolymers, FIG. 2, a transverse section approximately twice natural size through a tube formed of a foil as in FIG. 1 formed by overlapping and consolidation of its lengthwise edges, and FIG. 3, a partial axial section approximately natural size of a bellows-like hollow member formed in axial direction by gathering of the tube.

FIG. 1 shows a great enlargement of a transverse section through a piece of three-layer extruded plastic foil 1. The foil consists of a polypropylene middle layer 2, connected inseparably on each side with outside layers 3 and 4 of a copolymer which connects inseparably to polypropylene. Middle layer 2 forms the center web of foil 1 and is thicker and stronger than both outside layers 3 and 4, while these outside layers have a lower melting point than middle layer 2.

The foil is approximately 70 mm wide and approximately 10 m thick. Foil 1 is stretched both lengthwise and transversely following extrusion, and the polypropylene is oriented in two directions in a known manner which greatly increases the mechanical strength of the foil.

Figure 2:
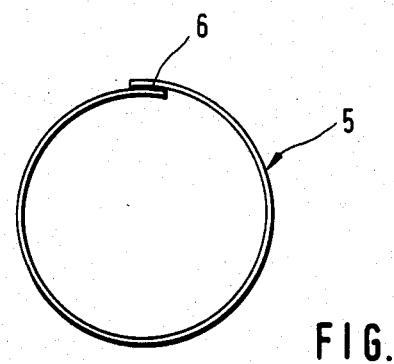

A cylindrical tube 5 is formed in this manner from foil 1, as shown in FIG. 2, by curving around its entire length and overlapping its lengthwise edges. Tube 5 is of approximately 20 mm diameter and any desired length. Thus, outside layers 3 and 4 come into contact in the overlapping area and are permanently consolidated by suitable heat application. The lengthwise seam 6 which occurs as a result of the consolidation is of approximately twice the thickness of foil 1.

Figure 3:
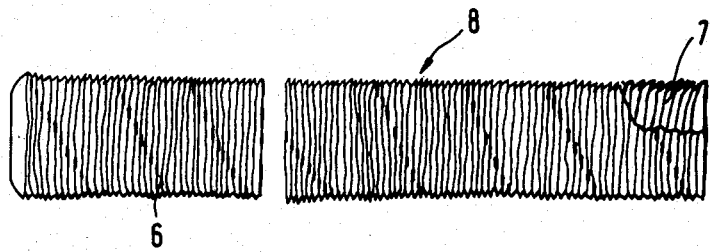

In this way, on a conventional gathering device, tube 5 is folded to form a plurality of folds 7 like bellows, forming a hollow member 8, and it is simultaneously rotated around its own axis, so that the straight lengthwise seam 6 follows the helical path shown in FIG. 3, and thus its added thickness is distributed around the entire periphery of hollow member 8. A uniform folding and packing is thus obtained, and at the same time hollow member 8 cannot buckle along its axis.

Hollow member 8 which is thus obtained is then subjected to lengthwise pressing together and heating to a temperature between 70° and 130° C., and an easily dissoluble consolidation of the folds is formed. The new fold stamping is fixed by final cooling.

The bellows-like gathered hollow member 8 is placed on the top of the filler pipe of a sausage machine, and its front end is passed through a so-called skin brake and is closed off before reaching the filler pipe opening. Then the meat emulsion is filled through the filler pipe into the tube. As the meat filler machine is working, the folded tube is stretched out progressively and because of the weak consolidation, the folds are again detached from each other. If desired, the folds can be reinforced by point gluing with suitable adhesive.

The final product is characterized in that it is based on a simple commercial production process, of which the final result is a tubular sheathing for the aforementioned purpose, which consists of a three-layer extruded foil in the configuration of a bellows-like folded and pressed-together tube with a helical lengthwise seam, of which the plurality of folds adhere together temporarily and then unfold slowly and continuously as a result of the thrust occurring during filling of the tube with meat emulsion to form the rope of sausage.

Of course, in practical application of the invention, it is possible to change certain individual features within the scope of the following claimed features of the invention.

I claim:

1. A process for producing a tubular sheathing useful as a peel-skin in the production of sausages comprising the steps of:
   (a) shaping a foil into a tube having overlapping lengthwise edges so as to form a lengthwise seam along its entire length, said foil comprising a biaxially stretched laminate of three inseparable layers of synthetic plastics, the middle of said layers being of polypropylene and being thicker and stronger than the outer layers, and the outer layers being copolymers having a lower melting point than said middle layer; and
   (b) gathering said tube along its entire length in bellows-like fashion to form a plurality of folds and rotating said tube around its axis so as to produce a helical path of said lengthwise seam on said tube.

2. A process for producing a tubular sheathing according to claim 1 further comprising the steps of:
   (c) pressing together and heating said gathered and rotated tube at a temperature between about 70° and 130° to consolidate the folds; and
   (d) cooling said tube to fix the resulting fold configuration.

3. A tubular sheathing useful as a peel-skin in the production of sausages comprising a biaxially stretched foil of three inseparately connected layers, said layers comprised of a middle layer of polypropylene which is thicker and stronger than the outer layers and two outer layers of copolymers having a lower melting point than the middle layer and strong adherent characteristics to said polypropylene, formed into a tube gathered axially into a bellows-like series of folds with a helical lengthwise seam, so that the folds adhere temporarily to each other and can be progressively pulled apart during filling.

* * * * *